(12) United States Patent
Johansen

(10) Patent No.: US 8,581,428 B2
(45) Date of Patent: Nov. 12, 2013

(54) WIND TURBINE COMPRISING INSULATION MONITORING SYSTEM

(75) Inventor: Brian Johansen, Ejby (DK)

(73) Assignee: Vestas Wind Systems A/S, Aarhus N. (DK)

( * ) Notice: Subject to any disclaimer, the term of this patent is extended or adjusted under 35 U.S.C. 154(b) by 127 days.

(21) Appl. No.: 13/060,981

(22) PCT Filed: Aug. 25, 2009

(86) PCT No.: PCT/DK2009/000188
§ 371 (c)(1),
(2), (4) Date: Jun. 7, 2011

(87) PCT Pub. No.: WO2010/022723
PCT Pub. Date: Mar. 4, 2010

(65) Prior Publication Data
US 2011/0248499 A1  Oct. 13, 2011

Related U.S. Application Data

(60) Provisional application No. 61/093,466, filed on Sep. 2, 2008.

(30) Foreign Application Priority Data

Aug. 31, 2008  (DK) .................................. 2008 01209

(51) Int. Cl.
*H02P 9/04* (2006.01)
(52) U.S. Cl.
USPC .......................................................... 290/44

(58) Field of Classification Search
None
See application file for complete search history.

(56) References Cited

U.S. PATENT DOCUMENTS

| | | | |
|---|---|---|---|
| 5,416,430 A | 5/1995 | Twerdochlib et al. | |
| 5,680,059 A | 10/1997 | Shiota et al. | |
| 8,143,899 B2 * | 3/2012 | Younsi et al. | 324/523 |
| 2005/0035768 A1 | 2/2005 | Rabach et al. | |
| 2006/0275121 A1 * | 12/2006 | Merswolke et al. | 416/132 B |

FOREIGN PATENT DOCUMENTS

WO  03/081747  10/2003

OTHER PUBLICATIONS

A. Areal Calama; International Search Report issued in priority International Application No. PCT/DK2009/000188; Jan. 19, 2011; 4 pages; European Patent Office.

* cited by examiner

*Primary Examiner* — Tulsidas C Patel
*Assistant Examiner* — Sean Gugger
(74) *Attorney, Agent, or Firm* — Patterson & Sheridan, LLP

(57) ABSTRACT

The present invention concerns a wind turbine comprising a generator, a controller and a measurement equipment connected to the generator, the measurement equipment being adapted to measuring at least one quality parameter indicating the quality of generator insulation of the generator, and the measurement equipment being adapted to transmitting the at least one quality parameter to the controller, wherein the controller is adapted to evaluate the at least one quality parameter according to a quality criterion and set up an alarm signal in accordance with the evaluation. Further, the invention relates to a method for upgrading a wind turbine.

17 Claims, 4 Drawing Sheets

WIND TURBINE COMPRISING INSULATION MONITORING SYSTEM

TECHNICAL FIELD

The present invention relates to wind turbines, monitoring of wind turbine generators and wind turbines comprising monitoring equipment. In particular the present invention relates to monitoring of generator insulation in wind turbines.

BACKGROUND

A known measuring technique within generator production lines is the so-called Partial Discharge Inception Voltage (PDIV) and Partial Discharge Extinction Voltage (PDEV) test. The test is a measure of the quality of the insulation system before shipping the generator to the customer. Over time, the quality of the insulation system deteriorates increasing the risk of breakdown.

Maintenance and repair of wind turbines is costly, in particular when the wind turbines are installed at remote places such as offshore. Further, the costs for repairing the generator insulation of the generator in a wind turbine are very low compared to replacement of the complete generator. It is therefore desired to be able to avoid catastrophic failures in wind turbine generators.

SUMMARY

It is an object of the present invention to provide a wind turbine having high performance and reduced costs for maintenance.

Accordingly a wind turbine is provided. The wind turbine comprises a nacelle comprising a generator having a stator, a rotor, and generator insulation, wherein the wind turbine comprises a controller and measurement equipment connected to the generator, the measurement equipment being adapted to measuring at least one quality parameter indicating the quality of the generator insulation. Further, the measurement equipment is adapted to transmitting the at least one quality parameter to the controller, wherein the controller is adapted to evaluate the at least one quality parameter according to a quality criterion and set up an alarm signal in accordance with the evaluation.

Further, a method for upgrading a wind turbine comprising a controller and a generator having a stator, a rotor, and generator insulation, is provided. The method comprises the steps of: installing measurement equipment adapted to measuring at least one quality parameter indicating the quality of the generator insulation, connecting the measurement equipment to the controller, and adapting the controller to evaluate the at least one quality parameter according to a quality criterion and set up an alarm signal in case the quality criterion is not fulfilled.

It is an important advantage of the present invention that measurement equipment is permanently installed in a wind turbine enabling continuous, scheduled or on-demand monitoring of the quality of the generator insulation system. Thereby, it is possible to prevent catastrophic failures, and overhaul, repair, and/or replacement of the generator can be scheduled in advance.

Further, it is an advantage that an operator of the wind turbine is able to determine the actual quality of the generator insulation in the wind turbine and schedule costly maintenance based on the measured quality. This is especially important when the wind turbine is an offshore wind turbine.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

Figure 1:
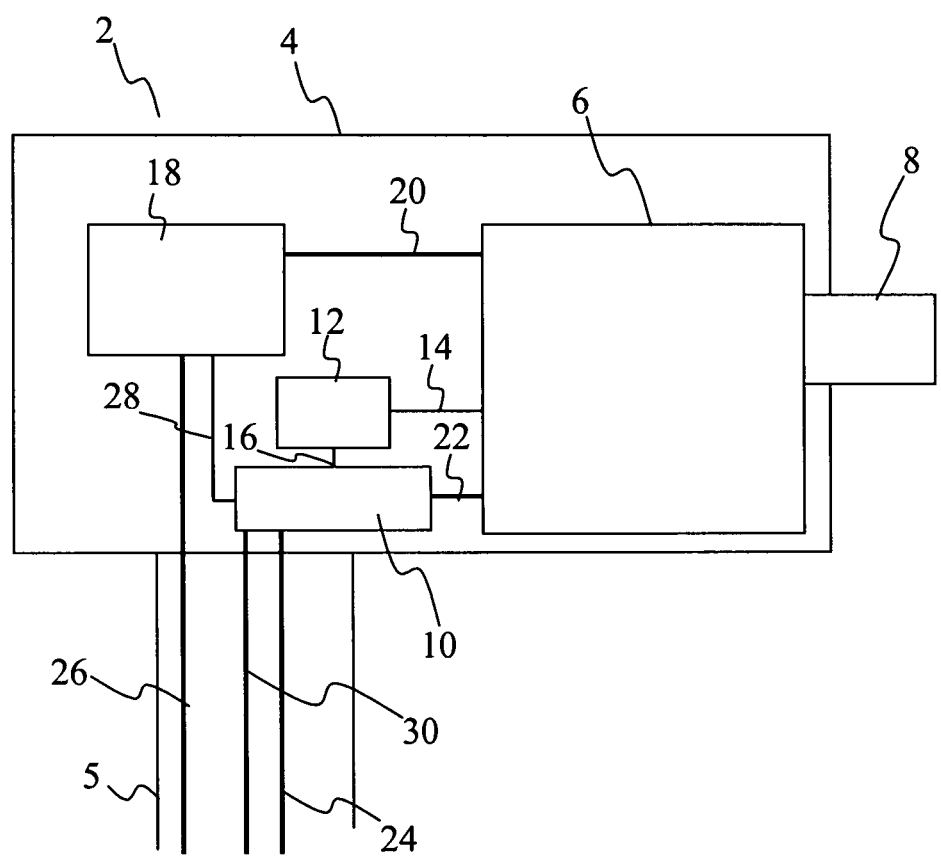
FIG. 1 schematically illustrates a first embodiment of the present invention.

The figures are schematic and simplified for clarity, and they merely show details which are essential to the understanding of the invention, while other details have been left out. Throughout, the same reference numerals are used for identical or corresponding parts.

The wind turbine of the present invention comprises measurement equipment being adapted to measuring at least one quality parameter indicating the quality of the generator insulation. The at least one quality parameter may comprise a plurality of quality parameters.

The quality parameter(s) may include one or more partial discharge (PD) parameters, e.g. PD magnitude, PD inception voltage (PDIV), PD extinction voltage (PDEV), PD intensity, and/or PD mapping.

Preferably, the at least one quality parameter indicating the quality of generator insulation comprises partial discharge inception voltage (PDIV) of the generator insulation, i.e. a first quality parameter may be PDIV.

In an embodiment, the at least one quality parameter indicating the quality of generator insulation may comprise partial discharge extinction voltage (PDEV) of the generator insulation, i.e. a second quality parameter may be PDEV.

In a preferred embodiment of the present invention, the measurement equipment is integrated in a power frequency converter connected to the generator and the controller.

It is an important advantage of the present invention that the quality of generator insulation in the wind turbine can be measured and monitored without the need for costly maintenance visits to the wind turbine. By permanently installing the measurement equipment in the wind turbine, measurements are not limited to take place e.g. during expensive and rare maintenance visits but can be performed at predetermined points in time, e.g. according to a measurement scheme.

The controller of the wind turbine is adapted to evaluate the at least one quality parameter according to a quality criterion and set up an alarm signal in accordance with the evaluation. The quality criterion may be a function taking one or more quality parameters as arguments and returning a value indicating the type of alarm signal. In an embodiment, the controller may be adapted to change operating parameters of the wind turbine depending on the evaluation of the at least one quality parameter. In an embodiment of the present invention, the controller is adapted to stop operation of the wind turbine if the evaluation shows that the quality of the generator insulation is not sufficient or critical, e.g. if one or more quality parameters, e.g. PDIV and/or PDEV, is/are below a critical value.

The controller may control operation of the measurement equipment, e.g. the controller may be adapted to initiate measurement(s) of the at least one quality parameter, e.g. according to a measurement scheme. The measurement equipment may be adapted to perform measurement of one or more quality parameters according to control signals from the controller and/or according to a measurement scheme. In an embodiment, the measurement equipment measures one or more quality parameters continuously or at a certain frequency, e.g. once each hour.

The controller may be remotely connected to an operator centre or facility monitoring operation of the wind turbine in question. When the controller sets up an alarm signal, the operator centre is notified that action has to be taken, either immediately or at some point in the future, e.g. within a month, thereby enabling the operator to plan and schedule maintenance visits in an efficient and cost-effective way.

FIG. 1 illustrates an embodiment of the present invention. The wind turbine 2 has a nacelle 4 and a tower 5, the nacelle 4 comprising a generator 6 having a stator, a rotor, and generator insulation. The generator 6 is driven by a driving shaft 8 that during operation is driven by the wings (not shown). The wind turbine comprises a controller 10 and measurement equipment 12 connected to the generator 6 and one or more sensors (not shown) via wire connection 14. The sensors are positioned in the generator, e.g. on the stator, in order to enable measurement of one or more generator insulation quality parameters. The measurement equipment 12 is adapted to measuring at least one quality parameter indicating the quality of the generator insulation. In the illustrated embodiment, the measurement equipment 12 measures the PDIV and/or the PDEV of the generator insulation, either continuously, with a certain frequency, or according to a measurement scheme. The measurement equipment 12 is connected to the controller 10 via connection 16 and adapted to transmitting the at least one quality parameter to the controller via connection 16. The controller 10 is adapted to evaluate the at least one quality parameter according to a quality criterion and set up an alarm signal in accordance with the evaluation. For example, the controller 10 may set up a first alarm signal if the result of the quality parameter evaluation indicates that the generator insulation requires maintenance or needs to be repaired within a certain time. The controller 10 may further be adapted to change one or more operating parameters of the wind turbine in accordance with the evaluation. For example, the controller 10 may, in addition to sending an alarm signal, be adapted to stop the wind turbine if the one or more quality parameters indicate that breakdown of the generator insulation is to be expected at any time or in the near future. The generator 6 is connected to the grid via power frequency converter 18 and cables/busbar 20, 22, 24, 26. Further, the controller 10 is connected (control connection 28) to the power frequency converter 18 to control operation of the power frequency converter during coupling of the wind turbine to the grid and general operation. The controller 10 is connected to the operator centre (not shown) via connection 30. The connection 30 may be wired or wireless. Control signals and operating data are exchanged between the wind turbine controller 10 and the operator centre and/or external controllers on the connection 30.

Figure 2:
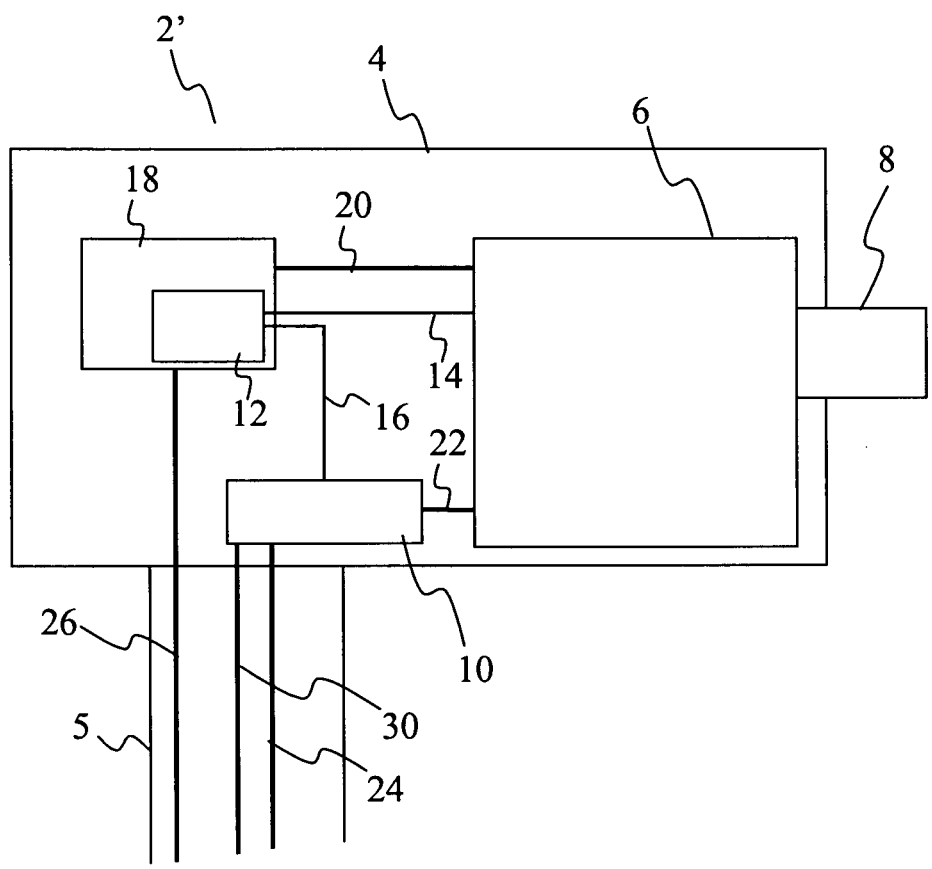
FIG. 2 schematically illustrates a second embodiment of the present invention.

FIG. 2 illustrates a further embodiment according to the present invention similar to the embodiment illustrated in FIG. 1. In the wind turbine 2' of FIG. 2, the measurement equipment 12 is integrated in the power frequency converter 18. Hereby, the measurement equipment may be fed with power from the power frequency converter.

The voltage level, which a wind turbine frequency converter 18 can generate, is normally limited by the voltage level of the DC link (not shown) of the frequency converter 18. The voltage level normally required to initiate the Partial Discharge, i.e. PDIV in a healthy machine, may be higher than the voltage level, which a standard wind turbine frequency converter can generate.

In FIG. 2, the wind turbine frequency converter 18 is designed for generating an electrical voltage signal to fit the frequency of the voltage of the generator 6. The electrical voltage signal is produced using some sort of pulse width modulation (PWM), where output signals switch from negative DC link voltage to positive DC link voltage (two-level converter). Other types of frequency converters 18 may employ a larger number of voltage levels to switch between.

The switch from negative to positive voltage is performed with a rate of 1-10 kV/µs. The turn on rate may depend on the gate resistor in the gate driver of the switching device. A commonly used switch is an insulated-gate bipolar transistor (IGBT). The turn off is controlled by the diode in the converter and cannot be changed. Thus, the frequency spectrum of the turn on signal can be changed by adjusting the gate resistor in the gate driver.

The PDIV level may be changed, e.g. lowered, by changing the frequency spectrum of the turn on rate of frequency converter switch.

Therefore by using the fact that the PDIV/PDEV level of the generator or other electrical component is temperature and frequency dependent, the frequency converter 18 can be used as a power source for the PD measurement.

A quality parameter indicating the quality of generator insulation may comprise partial discharge extinction voltage (PDEV) of the generator insulation. If the PDEV level can be reached by applying the voltage from the frequency converter 18 using sensors in the stator of the generator 6 a high risk of failure is present. Using the PDEV, where the level is within the voltage range of the frequency converter will of course be an indicator for a nearby failure of the generator, since the PDEV is in the normal operational voltage level. The wind turbine will still be productive and scheduled maintenance can take place prior to a failure.

Typically, the rotor of the generator 6 is connected to the grid via the power frequency converter 18, and the stator is connected to the grid via the controller 10.

The controller 10 controls operation of the wind turbine. Typically, the controller 10 is connected to an operator centre or facility and adapted to receive and send data and control signals from/to the operator centre enabling remote control of the wind turbine.

Figure 3:
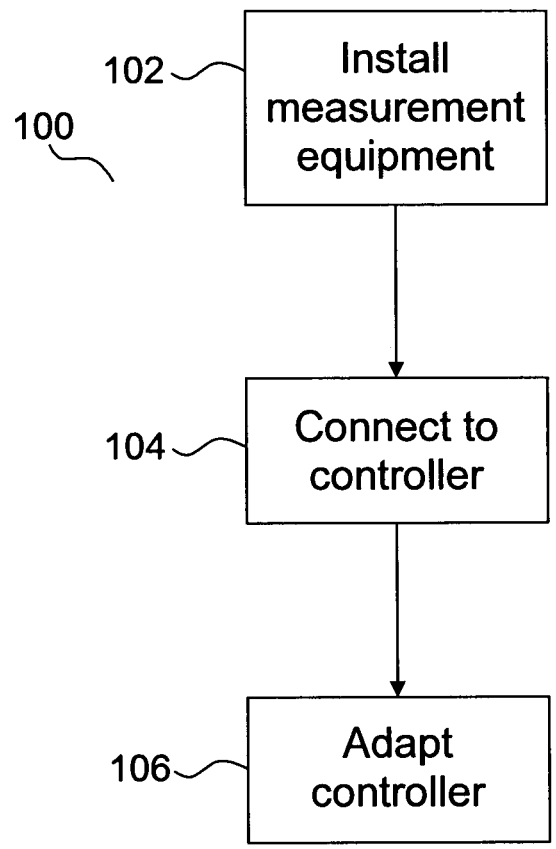
FIG. 3 illustrates an embodiment of the method according to the present invention.

FIG. 3 illustrates an embodiment of the method according to the present invention. The method 100 for upgrading a wind turbine comprising a controller and a generator having a stator, a rotor, and generator insulation, comprises the step 102 of installing measurement equipment adapted to measuring at least one quality parameter indicating the quality of the generator insulation. Further, the method 100 comprises the step 104 of connecting the measurement equipment to the controller, and the step 106 of adapting the controller to evaluate the at least one quality parameter according to a quality criterion and set up an alarm signal in case the quality criterion is not fulfilled. Step 106 may comprise installing one or more software modules in the controller, e.g. controller 10 of FIG. 1 and FIG. 2.

In an embodiment, the one or more quality parameters of the generator insulation may include quality parameters resulting from a first measurement and a second measurement taken at different locations in the generator, i.e. sensors connected to the measurement equipment may be positioned at various places in the generator. Accordingly, a first quality parameter may be PDIV at a first position in the generator and a second quality parameter may be PDIV at a second position in the generator.

Further, the one or more quality parameters of the generator insulation may be measured at different frequencies. Thus, the one or more quality parameters of the generator insulation may include quality parameters resulting from a first measurement at a first frequency and a second measurement at a second frequency.

Figure 4:
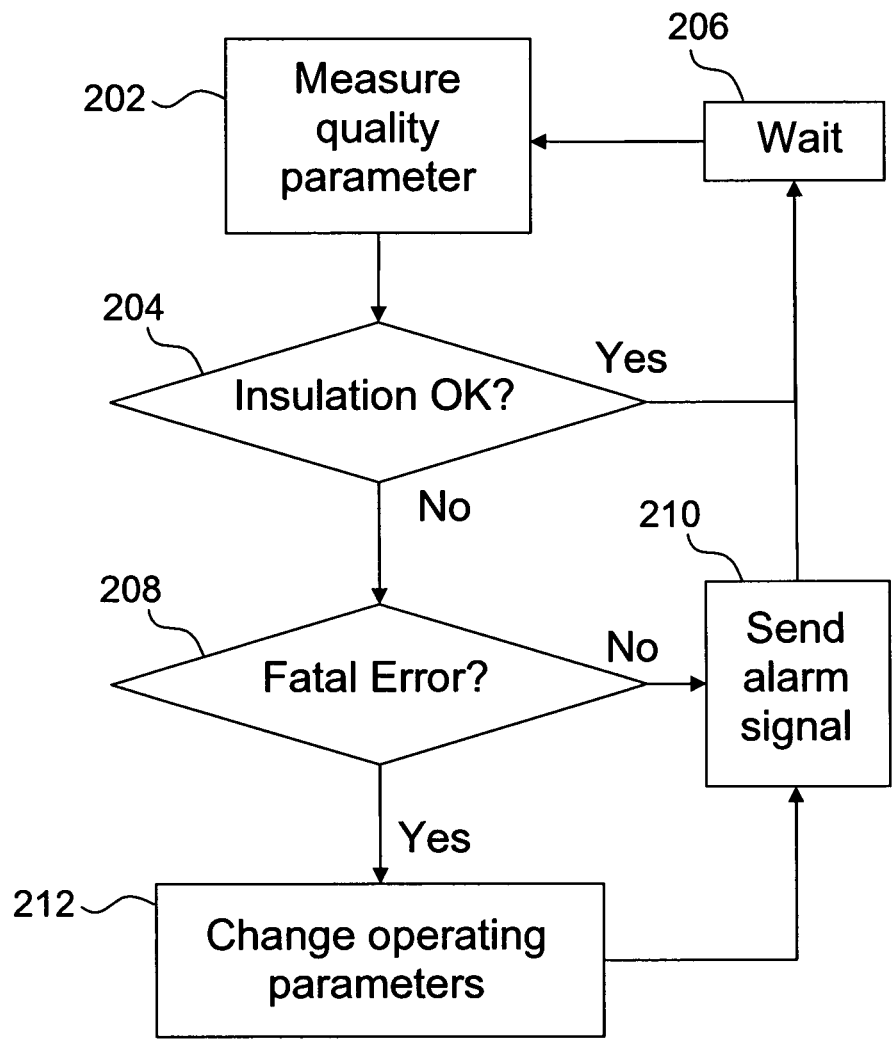
FIG. 4 shows a flow diagram of operation of a wind turbine according to the present invention.

FIG. 4 is a flow diagram illustrating operation of a wind turbine according to the present invention. In step 202, the measurement equipment measures one or more quality parameters of the generator insulation. The step 202 of measuring quality parameter(s) may be initiated by a control signal ("begin measurement") from the controller, e.g. according to a measurement scheme. The one or more quality parameters are sent to the controller, where they are evaluated in step 204. If the quality parameter(s) fulfill a quality criterion, i.e. generator insulation is ok, the wind turbine proceeds to a wait state 206 where the measurement equipment awaits a trigger or "begin measurement" signal from the controller. In an embodiment, the wait state is omitted, resulting in continuous measurement of generator quality parameter(s). In the evaluation step 204, the controller may store the value of one or more quality parameters and/or the result of the evaluation in a memory of the controller. If the evaluation indicates that something is not ok, the controller evaluates if a fatal error, i.e. an error requiring immediate action has occurred in step 208. If the error is not fatal, the controller sets up an alarm signal indicating the alarm type and/or the value of one or more quality parameters and/or the result of the evaluation by sending an alarm to an operator centre in step 210. If the error is fatal, the controller proceeds to step 212 of changing operating parameters of the wind turbine, e.g. stop the wind turbine, and subsequently sending an alarm signal in step 210. A fatal error may comprise a plurality of different errors, i.e. a number of different errors may be regarded as fatal, and each error may cause the controller to change the operating parameters in a different way. For example, a first set of operating parameters may be selected in case of a first fatal error, and a second set of operating parameters may be selected in case of a second fatal error. In an embodiment, the controller stops the wind turbine in case the evaluation shows that the quality of the generator insulation is critical, i.e. a breakdown can be expected in the near future. Thereby, a costly exchange of the whole generator may be avoided and instead the generator insulation may be repaired.

The evaluation step 204 may make use of earlier measurements of the generator insulation quality stored in the controller memory. Thereby the development in generator insulation quality over time may be included in the evaluation thereby improving the predictions on the future development of the generator insulation quality.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art.

The invention claimed is:

1. A wind turbine, comprising:
    a nacelle, comprising a generator having a stator, a rotor, and generator insulation;
    a controller;
    a power frequency converter coupled to the generator and the controller; and
    a measurement equipment coupled to the generator, wherein the measurement equipment is integrated in the power frequency converter and is configured to measure at least one quality parameter indicating the quality of the generator insulation, wherein the measurement equipment is further configured to transmit the at least one quality parameter to the controller, wherein the controller is configured to evaluate the at least one quality parameter according to a quality criterion and transmit an alarm signal based on the evaluation.

2. The wind turbine of claim 1, wherein the at least one quality parameter comprises one or both of a partial discharge inception voltage of the generator insulation and a partial discharge extinction voltage of the generator insulation.

3. The wind turbine of claim 1, wherein the measurement equipment is configured to measure one or more quality parameters according to a measurement scheme.

4. The wind turbine of claim 3, wherein the controller is configured to initiate measurement of the at least one quality parameter according to the measurement scheme.

5. The wind turbine of claim 1, wherein the controller is configured to change one or more operating parameters of the wind turbine based on the evaluation of the at least one quality parameter.

6. The wind turbine of claim 5, wherein the controller is configured to stop the wind turbine if one or more evaluated quality parameters are less than a predetermined value.

7. A method of upgrading a wind turbine comprising a controller, a generator having a stator, a rotor, and generator insulation, power frequency converter coupled to the generator and the controller, the method comprising:
    installing a measurement equipment within the power frequency converter, wherein the measurement equipment is configured to measure at least one quality parameter indicating the quality of the generator insulation;
    coupling the measurement equipment of the controller; and
    configuring the controller to evaluate the at least one quality parameter according to a quality criterion and transmit an alarm signal when the quality criterion is not fulfilled.

8. The wind turbine of claim 1, wherein the measurement equipment is powered by the power frequency converter.

9. The wind turbine of claim 1, wherein the power frequency converter acts a power source for the measurement of the at least one quality parameter.

10. A method of monitoring the quality of a generator insulation of a wind turbine comprising a generator in a nacelle, a controller, and a power frequency converter coupled to the generator and the controller, the method comprising:
    measuring, via a measurement equipment integrated in the power frequency converter and coupled to the generator, a first quality parameter indicating the quality of the generator insulation;
    receiving, by the controller, the measured first quality parameter from the measurement equipment, wherein the controller comprises a computer processor and a memory; and
    evaluating, via the controller, whether the measured first quality parameter fulfills a quality criterion.

11. The method of claim 10, wherein measuring the first quality parameter comprises measuring the first quality parameter at a plurality of locations within the generator.

12. The method of claim 10, wherein evaluating the measured first quality parameter is based on one or more previous measurements of the first quality parameter stored in the memory of the controller.

13. The method of claim 10, wherein the first quality parameter is one of a partial discharge inception voltage of the generator insulation and a partial discharge extinction voltage of the generator insulation.

14. The method of claim 10, wherein the first quality parameter is a partial discharge extinction voltage of the generator insulation, and wherein the quality criterion is a normal operational voltage value for the generator.

15. The method of claim 10, wherein evaluating the measured first quality parameter further comprises transmitting an alarm signal upon determining that the measured first quality parameter exceeds the quality criterion.

16. The method of claim 10, wherein the measurement equipment is powered by the power frequency converter.

17. The method of claim 10, wherein the power frequency converter acts as a power source for the measurement of the at least one quality parameter.

\* \* \* \* \*